(12) United States Patent  (10) Patent No.: US 9,283,974 B2
Cates  (45) Date of Patent: Mar. 15, 2016

(54) MOTORIZED FOLDABLE BEACH CART

(71) Applicant: Robert Cates, North Arlington, NJ (US)

(72) Inventor: Robert Cates, North Arlington, NJ (US)

( * ) Notice: Subject to any disclaimer, the term of this patent is extended or adjusted under 35 U.S.C. 154(b) by 68 days.

(21) Appl. No.: 14/181,637

(22) Filed: Feb. 15, 2014

(65) Prior Publication Data
US 2015/0232112 A1  Aug. 20, 2015

(51) Int. Cl.
B62B 3/02 (2006.01)
B62B 5/00 (2006.01)
B62B 3/00 (2006.01)

(52) U.S. Cl.
CPC . *B62B 3/02* (2013.01); *B62B 3/008* (2013.01); *B62B 3/009* (2013.01); *B62B 5/0033* (2013.01); *B62B 5/0066* (2013.01); *B62B 3/022* (2013.01); *B62B 3/025* (2013.01); *B62B 5/0069* (2013.01)

(58) Field of Classification Search
CPC .......... B62B 3/009; B62B 3/02; B62B 3/022; B62B 3/025; B62B 3/027; B62B 5/033; B62B 5/0066
USPC .............. 280/1.188, 7.1, 30, 643, 648, 47.18
See application file for complete search history.

(56) References Cited

U.S. PATENT DOCUMENTS

| 2,593,962 | A | * | 4/1952 | Barker | 280/30 |
| 2,620,041 | A | * | 12/1952 | Zenan et al. | 180/9.22 |
| 3,873,114 | A | * | 3/1975 | Brown | 280/30 |
| 4,049,284 | A | * | 9/1977 | Capper | 280/47.18 |
| 4,114,914 | A | * | 9/1978 | Cohen | 280/30 |
| 5,201,536 | A | * | 4/1993 | Bono et al. | 280/30 |
| 5,213,360 | A | * | 5/1993 | Lin | 280/648 |
| 6,267,393 | B1 | * | 7/2001 | Mengrone et al. | 280/37 |
| 6,502,656 | B2 | * | 1/2003 | Weiss et al. | 180/168 |
| 7,051,837 | B1 | * | 5/2006 | Brahier | 182/21 |
| 7,431,311 | B2 | * | 10/2008 | Turner et al. | 280/30 |
| 7,588,255 | B2 | * | 9/2009 | Katz | 280/47.27 |
| 7,798,886 | B1 | * | 9/2010 | Williamson | 446/456 |
| 7,818,840 | B2 | * | 10/2010 | Barnett et al. | 5/627 |
| 7,950,337 | B2 | * | 5/2011 | Chen | 108/115 |
| 8,418,709 | B2 | * | 4/2013 | Lindeman et al. | 135/96 |
| 8,424,136 | B2 | * | 4/2013 | Rozewicz et al. | 5/620 |
| 8,944,459 | B1 | * | 2/2015 | Hagy | 280/657 |
| 2009/0127807 | A1 | * | 5/2009 | Cornwell | 280/28.5 |
| 2009/0315300 | A1 | * | 12/2009 | Stiba | 280/648 |
| 2012/0242063 | A1 | * | 9/2012 | Bruckner | 280/651 |

FOREIGN PATENT DOCUMENTS

| CA | 2527077 | A1 | * | 5/2006 |
| WO | WO 2005113317 | A1 | * | 12/2005 |
| WO | WO 2011090494 | A1 | * | 7/2011 |

* cited by examiner

*Primary Examiner* — Kevin Hurley
*Assistant Examiner* — Maurice Williams
(74) *Attorney, Agent, or Firm* — Stephen Cannavale, Esq.

(57) ABSTRACT

The present invention pertains to a mobile cart which can be utilized as a cart for transporting beach supplies including toys, games, sporting goods, umbrellas, blankets, towels and food. Advantageously, the subject invention can be folded into a small suitcase like container and then opened to provide a cart as set forth herein. The cart according to the present invention may also include a self-propulsion system including a motor or motors for driving a tread, track or wheels along with a low friction skid surface or skis for directing the cart to a desired location. There may also be included a power source, for example batteries or solar panels, may be utilized to supply the power needed for self-propulsion and for powering or charging portable electronic devices, if desired.

9 Claims, 6 Drawing Sheets

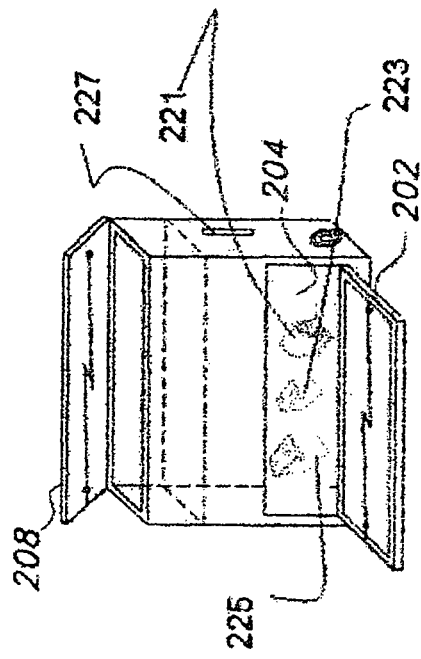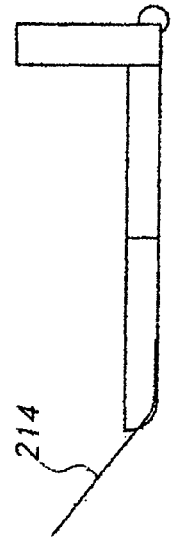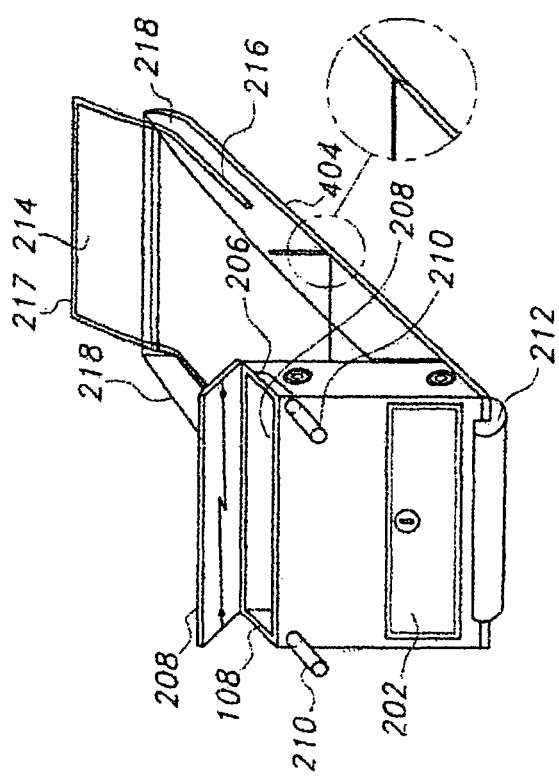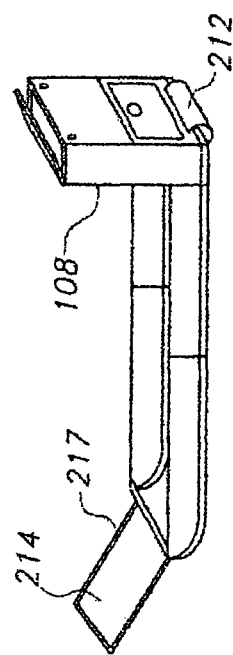

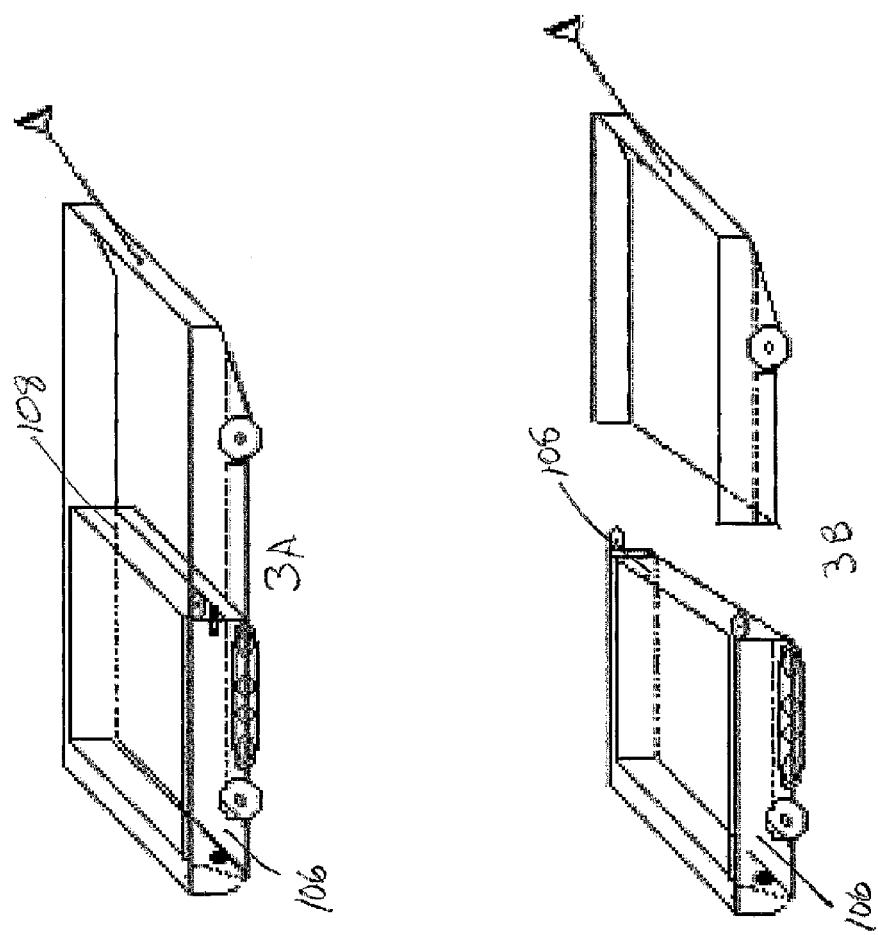

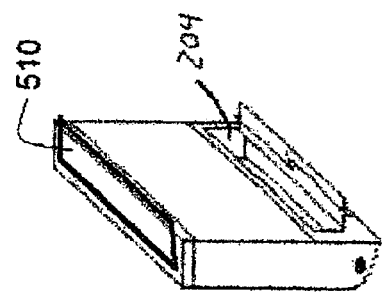
Fig. 5E
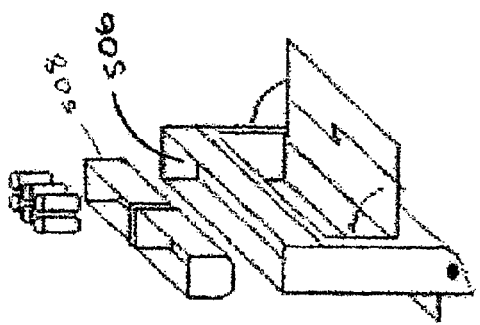
Fig 5D
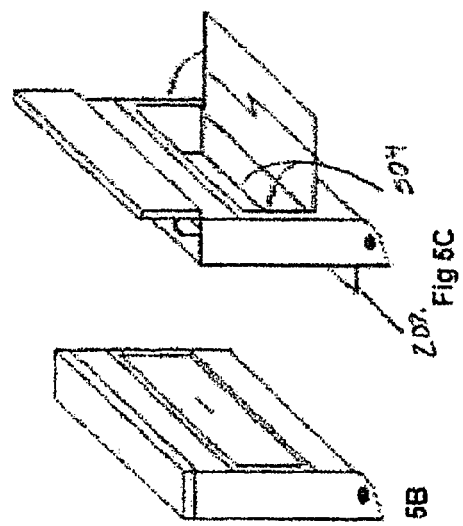
Fig 5C
Fig 5B
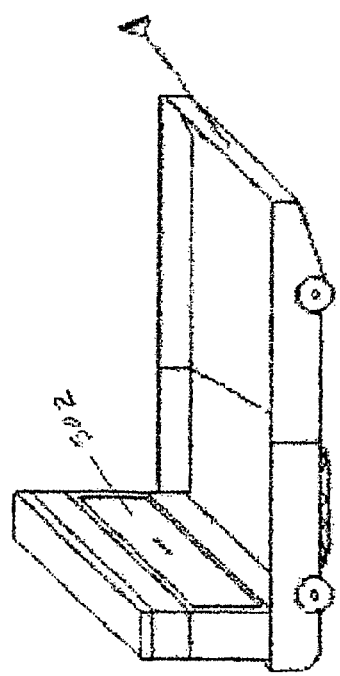
Fig. 6A
Figures 5A-5E

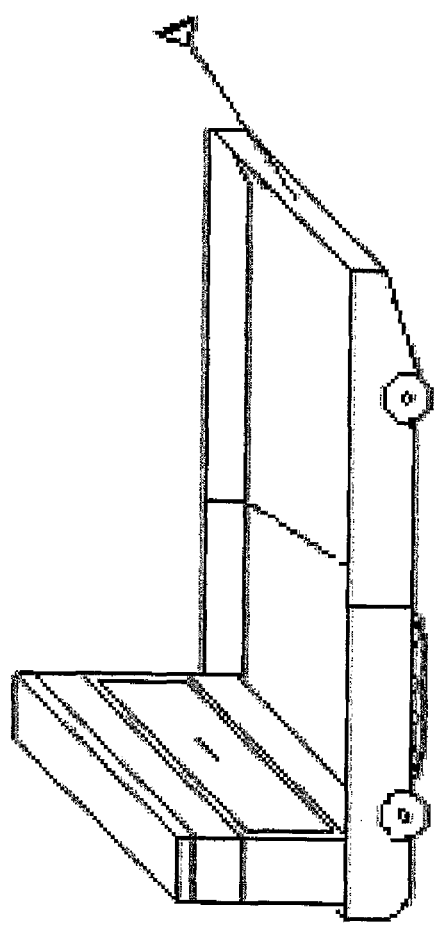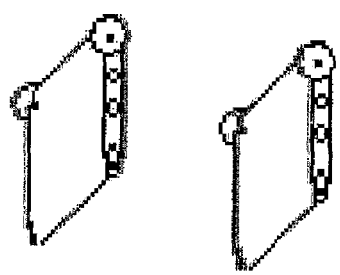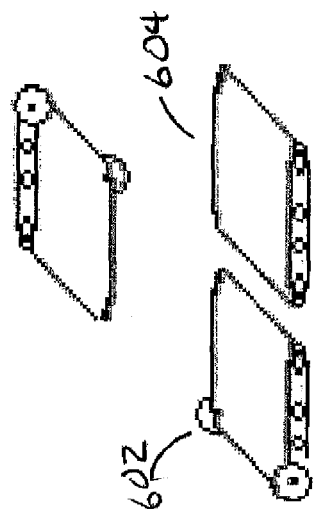
FIG. 6

MOTORIZED FOLDABLE BEACH CART

BACKGROUND OF THE INVENTION

1. Field of the Invention

The present invention relates generally to beach carts, and more particularly, to a motorized beach cart.

2. Description of the Related Art

Many beach-goers have homes or stay in hotels or beach houses near the beach or alternately drive to parking lots relatively near the beach, and then may have to make many trips to hand carry all of their beach supplies to the beach from their home or car. These supplies can include for example, chairs, umbrellas, and coolers. Thus, a beach cart for carrying such items is desirable to reduce the number of trips and to make it easier to transport heavy items. Such a cart, however, is typically transported in the car to and from the parking lot and thus must be of compact size so it can be easily packed in the car along with all the other items that are being transported for the day. In addition, pushing and/or pulling such a cart, particularly if heavily laden, can be inconvenient or impossible for some people who lack sufficient physical strength especially across the beach sand. To ease the physical burden on the beach goer, a motorized cart is desirable. Many examples of motorized carts are known, particularly with respect to motorized golf carts for carrying golf bags and clubs. But these carts lack features that are focused on the needs of beach cart users, are not always sufficiently compact for transportation to the beach and may be difficult to load with all of the beach provisions.

What is needed is a battery powered motorized beach cart that may be folded into a compact configuration for storage and transportation and provides a plurality of storage compartments adapted to carry different items, provides auxiliary features such as solar panel or other power generation devices for charging the drive motor batteries as well as powering personal devices such as personal portable electronic devices and provides a motorized drive system that is low weight, sturdy, efficient and adaptable for traversing sand, asphalt and boardwalk surfaces including ramps and stairs. the has a collapsible storage container and a collapsible frame for easy storage and transportation of the cart. Additionally, the cart should be stable, rugged, and adaptable to multiple transportation situations, including traversing sand and stairs.

SUMMARY OF THE INVENTION

The present invention provides a motorized beach cart for easily traversing different surfaces and which may be utilized for carrying beach provisions, providing storage compartments adapted to carrying particular items and provides auxiliary features and may be folded into a compact configuration for easy storage and transportation.

An object of the present invention is to substantially solve at least some of the above problems and/or disadvantages and to provide at least some of the advantages below. Accordingly, an object of the present invention is to provide a foldable motorized cart, comprising a front portion, a middle portion having a front end and a rear end and a rear potion, wherein the middle portion, is hingedly attached to the front portion at the front end and hingedly attached to the rear portion at the rear end, wherein each of the front portion, and the middle portion have a bottom floor and at least two side walls and an open top and wherein the rear portion has a bottom floor, four side walls and a top surface, and is foldable within the sidewalls of the middle portion and the front portion is foldable over the middle portion, a compartment within the rear portion having at least one storage space and a systems housing space, a motor drive system, a drive controller and a battery, wherein the battery and drive controller are electrically connected to the motor drive system and the motor drive system is mechanically linked to a drive track for propelling the motorized cart.

Another object of the present invention is to provide a motorized cart where the motor drive system is a tubular motor located within the drive track.

Another object of the present invention is to provide a motorized cart where the motor drive system is located within the system housing space.

Another object of the present invention is to provide a motorized cart where the rear portion top surface is hingedly rotatable from a closed to an open position.

Another object of the present invention is to provide a motorized cart where the drive controller is electrically connected to a control input device.

BRIEF DESCRIPTION OF THE DRAWINGS

The above and other objects, features and advantages of the present invention will become more apparent from the following detailed description when taken in conjunction with the accompanying drawings in which:

FIG. 2A is a rear perspective view of the motorized cart according to the present invention.

FIG. 2B is a rear perspective view of the rear portion of the motorized cart according to the present invention.

FIG. 2C is a rear perspective view of the rear portion of the motorized cart according to the present invention.

FIG. 2D is a side view of the rear portion of the motorized cart according to the present invention.

FIG. 2E depicts a top plan view of the motorized cart according to the present invention.

FIG. 3A is a side perspective view of the front and middle portion of the motorized cart according to the present invention.

FIG. 3B is a side perspective view of the front and middle portion of the motorized cart according to the present invention.

FIG. 5A is a side perspective view of the motorized cart according to the present invention.

FIGS. 5B-5E are side perspective views of the rear portion of the motorized cart according to the present invention in alternate configurations.

FIGS. 6A and 6B, depict a perspective view of the drive track system of the motorized cart according to the present invention.

DETAILED DESCRIPTION OF THE PREFERRED EMBODIMENTS

Exemplary embodiments of the present invention will be described herein below with reference to the accompanying drawings to assist in a comprehensive understanding of exemplary embodiments of the invention as defined by the claims and their equivalents. In the following description, well-known functions or constructions are not described in detail since they would obscure the understanding of the subject matter of the present invention in unnecessary detail by a person of ordinary skill in the art with unnecessary detail of the well-known functions and structures.

Preferred embodiments of the present invention will be described herein below with reference to the accompanying drawings. In the following description, detailed descriptions of well-known functions or constructions will be omitted since they would obscure the invention in unnecessary detail. Also, the terms used herein are defined according to the functions of the present invention. Thus, the terms may vary depending on user's or operator's intentions or practices. Therefore, the terms used herein must be understood based on the descriptions made herein.

Therefore, the terms used herein should be understood based on the descriptions made herein in view of the ordinary level of skill in the art. The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Figure 1:
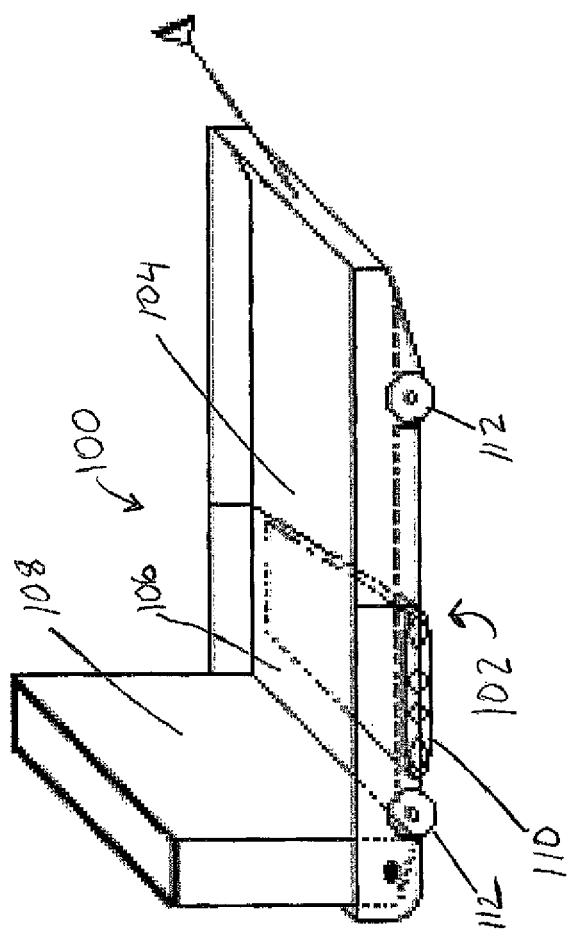
FIGS. 1 is a perspective view of the motorized cart according to the present invention.

Turning now to FIG. 1, there is provided a perspective view of the motorized cart according to the present invention. The motorized cart 100 includes a main body 102 which may be comprised, in this embodiment of three body portions. The body portions may include a front portion 104, a middle portion 106 and a rear portion 108. As will be further explained herein, after, the front, middle and rear portion are hingedly connected such that the main body may be closed into a compact form by folding the front portion, the middle portion and the rear portion into a suitcase like configuration. The motorized cart 100 further includes a motor for propulsion, (not visible in this view), a propulsion track 110, wheels 112 and a low friction bottom surface (not visible in this view).

Turning now to FIGS. 2A-2E, there are shown various views of the motorized cart according to the present invention. In FIG. 2A there is shown a rear view of the motorized cart depicted in FIG. 1. Shown in this view is a rear view of the cart 100 in which rear portion 108 is visible. Additionally, there is shown a storage cabinet cover 202, which is closed in FIG. 2A, wherein it covers the storage cabinet 204. The storage cabinet is located within the articulating portion of the rear portion 108 and is adapted to carry small or fragile items that require the additional protection of being transported in a protected environment. In another embodiment, storage cabinet 204 may be an insulated container for transporting and storing perishable foods and drinks. In that embodiment, the storage container may be filled with ice up to a level just below the storage cabinet cover 202, or may alternately have ice placed in the top cabinet 206 to serve as a coolant for the storage cabinet 202. Top cabinet 206 is covered by a hinged lid 208 which may be pivoted between a closed and open position thereby providing access to top cabinet 206 so that items or ice may be placed therein. The rear portion 108 storage cabinet may also include an interior space for holding the different drive and control systems of the motorized cart. These may include the drive motor, 221 the drive motor and accessory batteries 223 and 225 respectively, the control circuit and charging circuit with a charging connector, 227. Typically, these items will be located in the bottom of the storage cabinet so that the weight balance and distribution is maintained in a matter which balances the cart and makes movement and maneuverability easy for the user.

Also shown in FIG. 2A there are also provided handles 210 which a user may grasp to direct the motorized cart. The handles can be used for steering the cart as they may include a control mechanism, such as a rotatable throttle as used on motorcycles where a user can rotate either the right or left handle to increase power of a motor on the respective side of the motorized cart 100 to impart increased thrust on one side of the cart and thus steer the cart to turn toward in a direction corresponding to the increased power. The rotatable throttles can also be used to increase the power of either the right side or left side drive motor and thus steer the cart by imparting greater drive thrust to one side. The throttles can also be rotated in such a way to reverse the motors and move the motorized cart in a backwards direction.

Also visible in FIGS. 2A and 2C is a roller 212 which may serve as a wheel for the rear portion 108 of the motorized cart and may also be engaged with one or more drive motors for imparting forward thrust to move the motorized cart. As will be apparent to one skilled in the art, drive wheels may be attached to the drive motor by a belt, chain or gear system for imparting power from the motor to the drive wheels. An appropriate linkage and or transmission may be provided for driving more than one wheel for adjusting the motor power output to the wheels.

The motorized cart 100 may also include a fold out flap 214 which is hingedly connected to the front portion 102 and may fold out towards the front of the motorized cart 100 to extend the front of the cart 100 to increase storage and carrying space as well as to prevent debris from entering the cart 100. This is especially helpful to keep the inside of cart 100 from accumulating sand or snow or other residue when using the cart on such loose surfaces. The fold out flap may also be attached to the front portion 102 by a telescoping rod 216. The front flap may be thus extended to lengthen telescoping rod Further, the front portion 102 and the middle portion 104 are formed having a bottom wall and side walls 218 which form a tray with an open top for storing and carrying items. Additionally, when folded, as will be shown and described with respect to FIGS. 4C-4E, the sidewalls form the sides of a carrying compartment in the form of a suitcase or carrying case. FIG. 2E depicts a top plan view of the motorized cart, showing a generally rectangular shape, although the motorized cart shape is not so limited and may be shaped in various alternate forms in keeping with the present invention.

Turning now to FIGS. 3A-B, there is shown a side perspective view of the motorized cart 100 in a partially folded configuration where rear potion 108 is folded within middle potion 106. In the view shown in FIG. 3B, the front portion 102 is depicted as detached from the middle portion 106 and may in another step be attached to the middle potion 106 to form a closed container. This may be accomplished using various attaching means such as hooks, snaps, hook and loop fabric, clasps and buckles. Alternately, where the front portion 102 is hingedly attached to the middle portion 106, the front portion may be folded over the rear and middle portion to form a closed container or case. As can be further seen in FIG. 3A-B, the motorized cart may also include a tow rope 302 and handle 304 for assisting in moving and steering the cart 100. The tow rope and handle may in one embodiment be a simple rope, cable or chain with a handle for gripping by a user where the user may impart additional power to pull the cart where the motor and drive tread runs at a constant speed, force, thereby only providing an assist to the user but not being the primary drive source. Alternately tow rope 302 and handle 304 may provide a motor control device such as a handle with push buttons or switches for controlling motor drive speed and power output, either through a direct analog circuit or through a digital control circuit as would be used by one skilled in the art of motor controls.

The handle in such an embodiment may include electronic controls as well and be connected to the motorized cart using a wire for an electrical connection. In another alternate embodiment, the handle may include a communications circuit such as a Blue tooth, IR or RF device for communicating through a Blue tooth, IR or RF communications circuit on the motorized cart and interfacing with a motor controller circuit. In this way a user can carry a remote control that wirelessly links to the motorized cart for controlling the movement and other features of the motorized cart as will be further explained herein.

Figure 4:
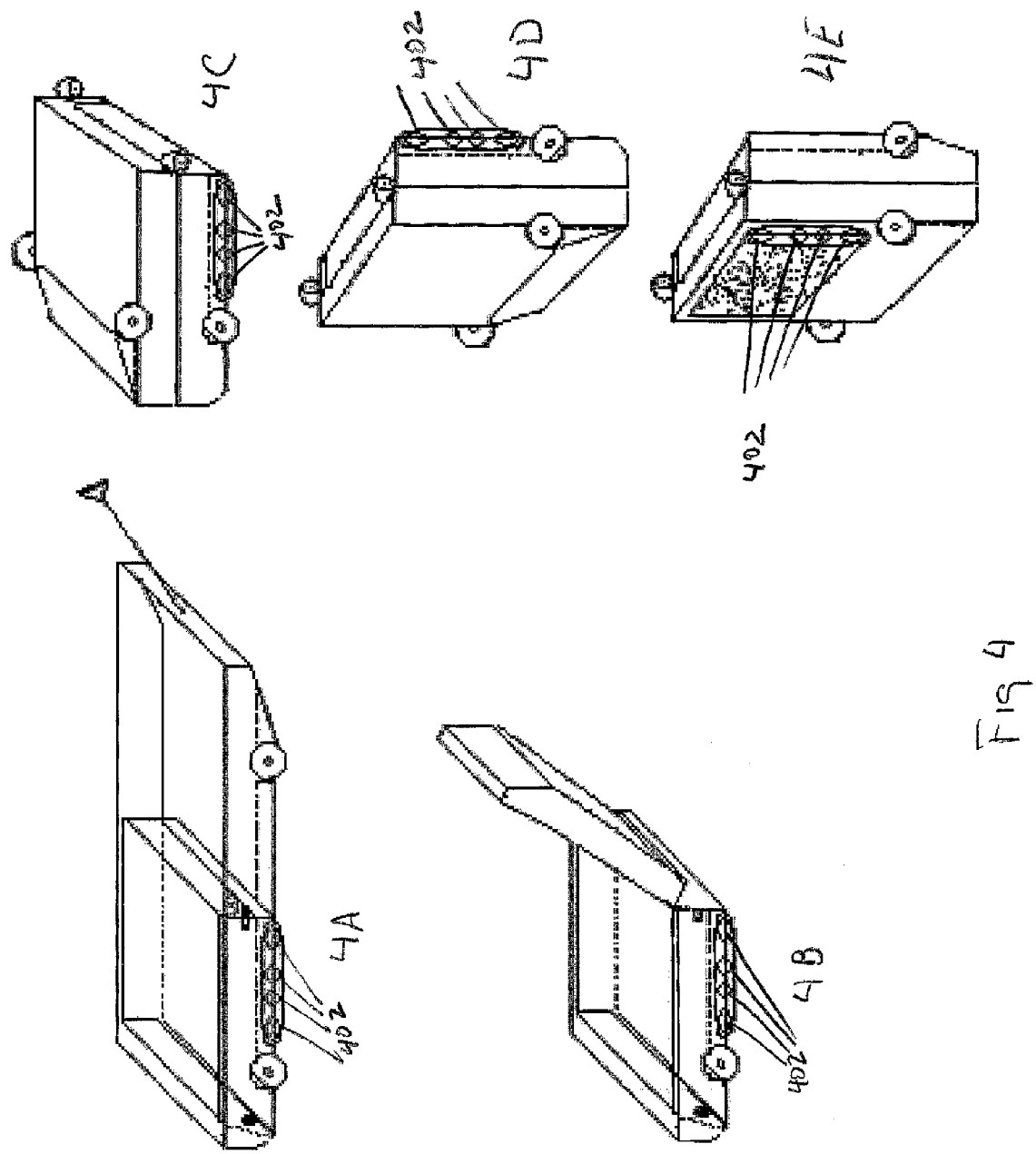
FIG. 4A is a side perspective view of the front and middle portion of the motorized cart according to the present invention.
FIG. 4B is a side perspective view of the front and middle portion of the motorized cart according to the present invention in a partially folded configuration.
FIG. 4C is a side perspective view of the front and middle portion of the motorized cart according to the present invention in a horizontal folded configuration.
FIG. 4D is a side perspective view of the front and middle portion of the motorized cart according to the present invention in a vertical folded configuration.
FIG. 4E is a side perspective view of the front and middle portion of the motorized cart according to the present invention in a vertical folded configuration.

Turning now to FIGS. 4A-E, there is shown a perspective view of the motorized cart 100 according to the present invention. In FIG. 4A the cart is shown with only the rear portion 108 fully folded into the middle portion 106, and the middle portion 106 and the front portion 102 being in a horizontal co-planar flat orientation. In FIG. 4B, the motorized cart is shown with the front portion 102 partially folded with respect to the middle 106 and the rear portions 108. In FIG. 4C, the motorized cart is shown in a completely folded configuration wherein the front portion 102 has been folded over the middle and rear potions and forms an enclosed case. When folded in this manner the rear potion is folded within the side walls of the middle portion and then the front portion may be folded over the rear portion which has already been folded within the middle portion. In this configuration, the motorized cart can be easily stored or transported. In the view of FIG. 4D, the motorized cart has been up-righted to a vertical position from the horizontal position shown in FIG. 4C, with the bottom of front portion 102 visible. In the view of FIG. 4E the vertically standing motorized cart 100 has been turned around such that now the bottom of rear portion 108 is visible. In this view, the drive or propulsion track 110 is visible on the bottom of rear portion 108. The drive track 110 is located on the bottom of rear portion, such that it is in contact with the ground when the motorized cart is in the open horizontal position. In that position, when the track 110 is moved by the electric motors, the motorized cart can be pushed along surface of the ground but the force exerted by the track upon the ground surface.

Also visible in FIGS. 4A-4E are drive motors 402. In one embodiment, the drive motors 402 may be tubular motors, such as those typically used to power conveyor belt systems. The tubular motors may be installed and rigidly mounted under the motorized cart in such a way to provide power to the track as will be known by one skilled in the art. The drive track 110 may be one such as used on a snowmobile for example with a profile adapted to be used on both loose surfaces such as sand or more firm surfaces such as grass fields, concrete or asphalt. In addition, the it is not necessary in accordance with the present invention to use tubular motors, but instead a motor or motors attached to a drive shaft and sprocket system such as those used in snowmobiles may be used to power the track 110. In another alternate embodiment, a motor or motors may be attached to a drive axle to power a wheel or wheels, such as wheels 112 may be utilized to eliminate the need for a drive track.

Turning now to FIGS. 5A-5E, there is shown a perspective view of the motorized cart 100 with a detailed view of rear potion 108 showing exemplary compartments which may be included in various embodiments of the present invention. FIG. 5A shows rear portion 108, having a top lid 208, which may be hinged as shown in FIG. 2 or FIG. 5B, a top compartment 206, a front door 502 for closing a compartment 504. FIG. 5B shows the rear portion with the top lid 208 and front door 502 in a closed position. Also, the rear door 202, not seen in this view, is closed. Turning to FIG. 5C, there is shown the rear portion with the top lid 208 and front door 502 in an open position. Also, the rear door 202 is open and can be seen extending horizontally from the back of the rear portion 108. Likewise FIG. 5C shows the rear portion with the top lid 208 and front door 502 in an open position. Also, the rear door 202 is open and can be seen extending horizontally from the back of the rear portion 108. In the embodiment shown in FIG. 5D, there is shown an embodiment where top compartment is open and includes containers 508 for holding items which may include for example drink cans or bottles. In one embodiment, the containers 508 may be insulated container for keeping items cold or hot. In the case of cold items, compartment 506 may be partially filled with ice and containers 508 rested within the ice. Alternately, the compartment 504 may be filled with cold packs for keeping compartments 204, 504 and 506 cold and thus the items therein. Alternately, the insulated containers may hold thermos type containers for keeping the contents hot. The insulated containers 508 may be removable as shown in FIG. 5D. As shown in FIG. 5E, The top lid 208 may also incorporate solar panels 510 covering the top surface for recharging the drive motor batteries or for providing power to charge portable electronic devices. The solar panels may be electrically connected to the drive motor batteries through a charging circuit in a manner as will be understood by one skilled in the art. Additionally, the solar panels may be connected to separate accessory batteries through a charging circuit for charging the accessory batteries. There may also be electrical connectors for connecting portable electronic devices to the accessory batteries, such that a user can charge a portable electronic device using the accessory batteries, while the solar panel can re-charge the one or more accessory batteries thereby extending the useful life of the accessory battery. Alternately or additionally, there may also be provided other power generation devices such as a hand cranked generator, (not shown) or even a wind powered generator or wind turbine, which may be a Horizontal-axis wind turbine or a Vertical-axis wind turbine as are known in the art (not shown).

Turning to FIG. 5E, there is shown the rear portion 108 from FIGS. 5A-5D from the reverse perspective where in the rear door 202 is visible and in an open position to reveal inner compartment 204. This rear compartment may be used for holding drive components of the motorized cart for example batteries, an electronics control panel for connecting to control device such as a remote control or throttles. Additionally, there may be provided a charging circuit so that a user may be able to recharge both the drive motor batteries and the accessory batteries by connecting the charging circuit to a standard household current outlet.

Turning now to FIGS. 6A and 6B, there is shown a perspective view of the drive track system of the motorized cart according to the present invention. As described above, the drive or propulsion track 110 is typically attached to the bottom of rear portion 108. The drive track 110 is located on the bottom of rear portion, such that it is in contact with the ground when the motorized cart is in the open horizontal position. In that position, when the track 110 is moved by the electric motors, the motorized cart can be pushed along surface of the ground but the force exerted by the track upon the ground surface. To aid in the construction, use and maintenance of the motorized cart according the present invention, the drive track system may be a self contained and modular component such that it can be removed from the motorized cart for maintenance and repair. As shown in FIG. 6A, the track 110 may include a drive track 602 which is motorized as described herein and may include a non drive track 604, which does not have any motor drive, but instead moves freely on rotating wheels or track idler wheels which allow the track to move freely across the ground, while still maintaining uniform and consistent directional stability. The drive track system may be rigidly attached to the bottom of the cart in a manner as would be understood by one skilled in the art.

Also visible in FIGS. 6A and 6B are drive motors 402. In one embodiment, the drive motors 402 may be tubular motors, such as those typically used to power conveyor belt systems. The tubular motors may be installed and rigidly mounted under the motorized cart in such a way to provide power to the track as will be known by one skilled in the art. The drive track 110 may be one such as used on a snow mobile for example with a profile adapted to be used on both loose surfaces such as sand or more firm surfaces such as grass fields, concrete or asphalt. In addition, the it is not necessary in accordance with the present invention to use tubular motors, but instead a motor or motors attached to a drive shaft and sprocket system such as those used in snowmobiles may be used to power the track 110. In another alternate embodiment, a motor or motors may be attached to a drive axle to power a wheel or wheels, such as wheels 112 may be utilized to eliminate the need for a drive track. Such wheels may be of a design having a large contact patch surface area so as to more evenly distribute the weight of the cart on the ground and thereby make it easier to move the cart across soft or uneven ground.

As will be apparent to one skilled in the art, the motor drive system and drive track can be connected to a controller circuit for controlling the motor drive output. In other works, the drive track can be controlled to move the motorized cart in a forward or backward direction and be turned by adjusting the power output of the motors in accordance with inputs from the user through a control device. The control device may include buttons, joysticks or other control input devices known in the art for controlling the motor drive system and therefore controlling the movements of the motorized cart.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims and their equivalents. Therefore, the scope of the present invention should not be limited to the above-described embodiments but should be determined by not only the appended claims but also the equivalents Therefore, and all differences within the scope will be construed as being included in the present invention.

What is claimed is:

1. A foldable motorized cart, comprising:
a front portion; a middle portion having a front end and a rear end and a rear potion, wherein the middle portion is hingedly attached to the front portion at the front end and hingedly attached to the rear portion at the rear end; wherein each of the front portion and the middle portion have a bottom floor and at least two side walls and an open top; and wherein the rear portion has a bottom floor, four side walls and a top surface, and is foldable within the sidewalls of the middle portion; and the front portion is foldable over the middle portion; a compartment within the rear portion having at least one storage space and a systems housing space, a motor drive system, a drive controller and a battery, wherein the battery and drive controller are electrically connected to the motor drive system and the motor drive system is mechanically linked to a drive track for propelling the motorized cart; and wherein the motor drive system is located within the system housing space.

2. A foldable motorized cart as in claim 1, wherein the rear portion top surface is hingedly rotatable from a closed to an open position.

3. A foldable motorized cart as in claim 1, wherein the drive controller is electrically connected to a control input device.

4. A foldable motorized cart as in claim 1, further having a set of wheels rotatably attached to the bottom of the front portion.

5. A foldable motorized cart as in claim 1, further having a set of wheels rotatably attached to the bottom of the middle portion.

6. A foldable motorized cart as in claim 1, further having a low friction surface attached to the bottom of the front portion, the middle portion and the rear portion.

7. A foldable motorized cart as in claim 1, further having an accessory battery.

8. A foldable motorized cart as in claim 7, further having an electrical connector for connecting electronic devices to the accessory battery.

9. A foldable motorized cart as in claim 7, further having a charging circuit and a solar panel for charging the accessory battery.

* * * * *